United States Patent [19]  [11]  4,407,077
Smith  [45]  Oct. 4, 1983

[54] BELT DRIVE SYSTEM

[75] Inventor: Dennis E. Smith, Auckland, New Zealand

[73] Assignee: Fisher & Paykel Limited, Auckland, New Zealand

[21] Appl. No.: 304,059

[22] Filed: Sep. 21, 1981

[30] Foreign Application Priority Data

Oct. 24, 1980 [NZ] New Zealand .......................... 195362

[51] Int. Cl.³ ............................................. F26B 11/04
[52] U.S. Cl. ....................................... 34/108; 34/133; 474/134; 474/135
[58] Field of Search ................. 34/133, 108, 121, 130; 474/134, 135

[56] References Cited

U.S. PATENT DOCUMENTS 976,115 11/1910 Bard ..................................... 474/134
2,576,582 11/1951 Elliott ................................. 474/134
4,069,719 1/1978 Cancilla .............................. 474/134
4,300,293 11/1981 Gladysz ............................... 34/133

Primary Examiner—Larry I. Schwartz
Attorney, Agent, or Firm—Holman & Stern

[57] ABSTRACT

A belt drive system preferably for a clothes dryer has a high ratio of diameters between driving and driven members and has a pair of idler pulleys positioned close to the smaller member and mounted on a tensioning member to keep the belt in tension, and the closer adjacent faces of the idler pulleys are spaced apart by a distance not materially different from the diameter of the smaller member.

4 Claims, 3 Drawing Figures

BELT DRIVE SYSTEM

FIELD OF THE INVENTION

This invention relates to a drive system particularly though not solely for use as a drive system for a clothes drying drum.

BRIEF SUMMARY OF THE INVENTION

This invention consists in a drive system comprising driving and driven rotatable member having a high ratio of diameters, so that one is large and the other small, a flexible endless driving band mounted on said rotatable members, a pair of pulleys bearing on said driving band to maintain said driving band in contact with said rotatable members, and tension means acting on said pulleys so that said pulleys maintain tension in said driving band, said pulleys being positioned adjacent said small rotatable member in substantially symmetrical relationship to said small rotatable member so that reversal of direction of the driving rotatable member does not materially affect power transmission, and said pulleys being spaced apart by a distance such that the closer adjacent faces of the pulleys are separated by a distance not materially different from the diameter of said small rotatable member.

In a further aspect the invention consists in a clothes dryer having a cabinet and in said cabinet a rotatable drum an air heating means and an electric motor having a shaft and a drive system according to the preceding paragraph between said shaft and said drum.

To those skilled in the art to which this invention relates, many changes in construction and widely differing embodiments and applications of the invention will suggest themselves without departing from the scope of the invention as defined in the appended claims. The disclosures and the descriptions herein are purely illustrative and it is not our intention to limit the scope of the invention by those disclosures and descriptions, or otherwise, than by the terms of the appended claims.

BRIEF DESCRIPTION OF THE DRAWINGS

One preferred embodiment of the invention will now be described with reference to the accompanying drawing wherein.

DETAILED DESCRIPTION

Figure 1:
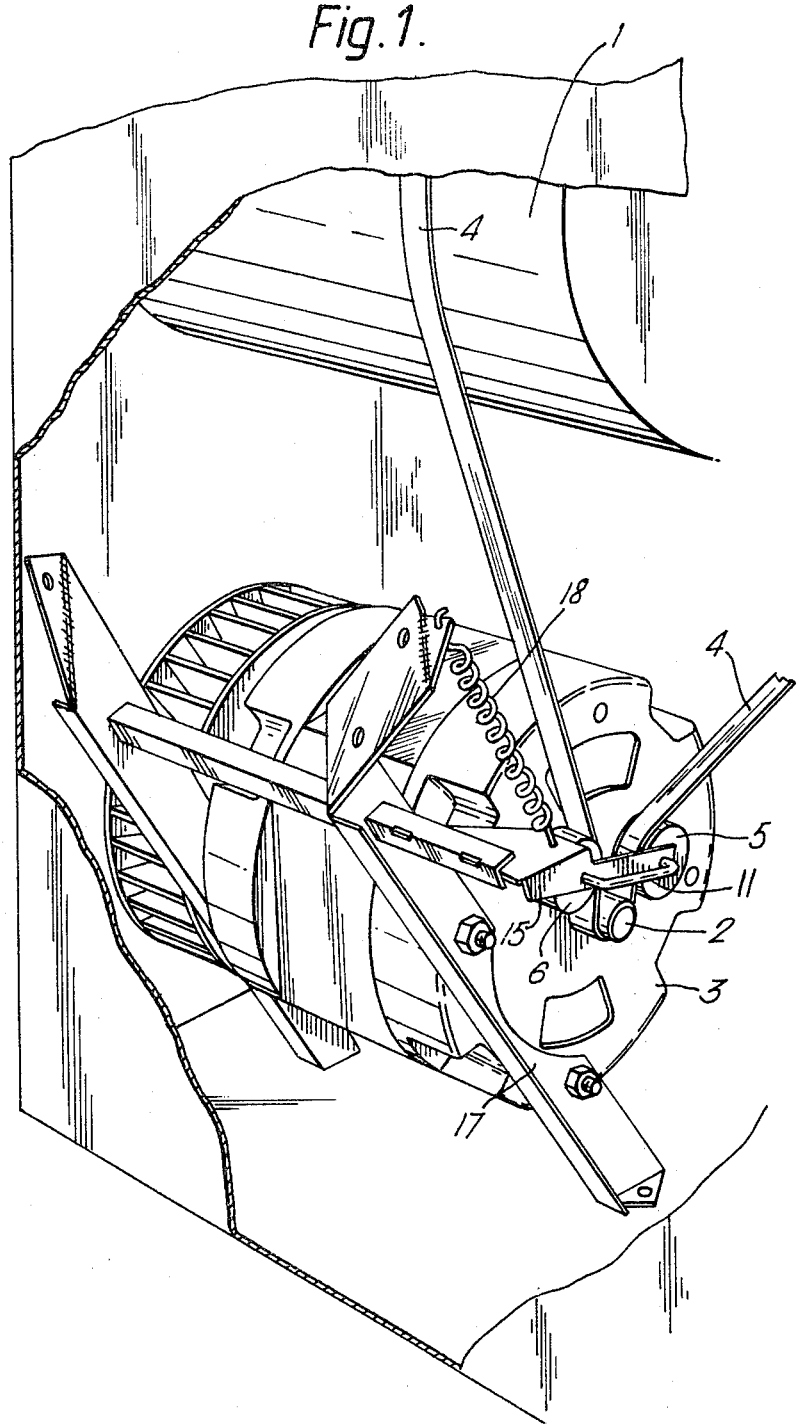
FIG. 1 is a perspective view of part of a clothes dryer incorporating a drive system according to the invention.
Figure 2:
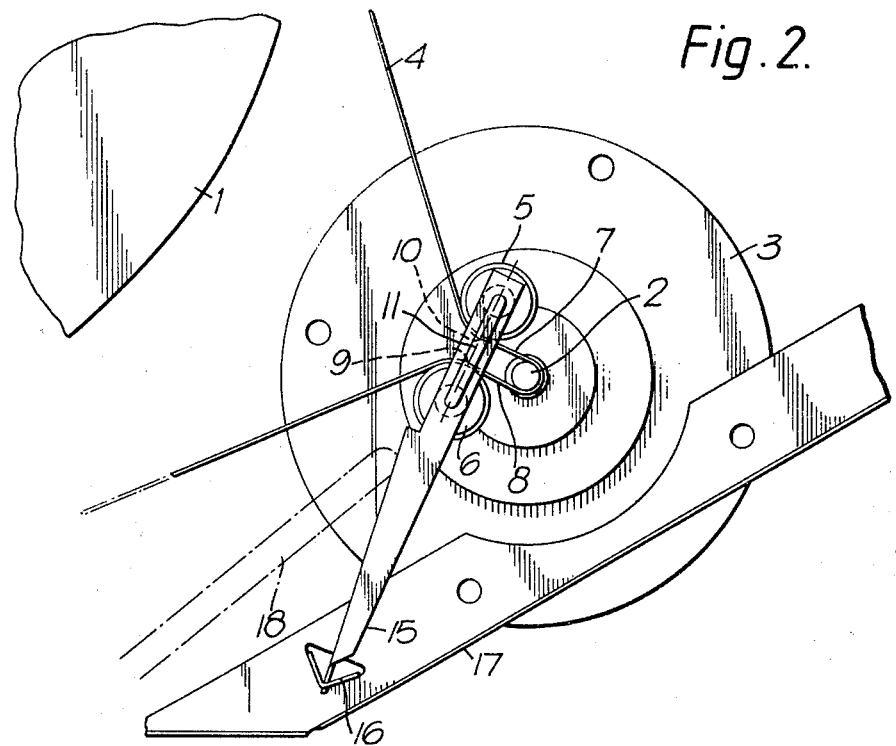
FIG. 2 is a side elevation view of the drive system according to the invention.

A pair of rotatable members are provided, one a driving member and the other a driven member, and the larger member preferably comprises a drum of a clothes dryer having a cabinet and in said cabinet, the rotatable drum 1, air heating means, an electric motor 3 having a drive shaft and a drive system as follows.

A smaller pulley 2 is the driving member and is integral with or mounted on a shaft driven for example by a motor such as the electric motor 3.

About the drum and drive pulley is provided a flat belt 4.

A pair of idler pulleys 5 and 6 are provided, one on each side of drive pulley 2 and preferably equi-distant from the drive pulley, and the belt 5 also passes between the idler pulleys 5 and 6 so that the outer surface of the belt contacts the pulleys.

The pulleys 5 and 6 are provided adjacent the drive pulley 2 and are positioned so that a line 11 joining the centers of the pulleys is substantially normal to the parts 7 and 8 of the belt which lie between the drive pulley 2 and the pulleys 5 and 6.

Figure 3:
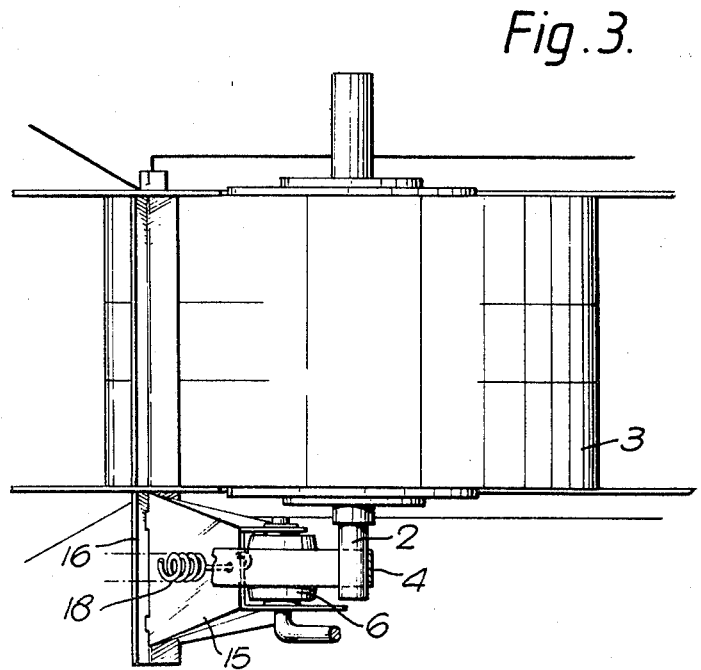
FIG. 3 is a plan view of the construction of figure.

The idler pulleys are crowned on their peripheral surface, as may be seen in FIG. 3 to provide centering for the belt and thus substantially obviating the need to provide a crown on the drive pulley 2.

The idler pulleys 5 and 6 maintain a tension on the belt and this is achieved by providing an arm or lever 15 which lies along an extension of the line 11 and which is pivotally affixed at 16, for example to a supporting structure in the clothes dryer, e.g. part of the cabinet or, as shown, a motor mounting bracket 17, and the arm is spring loaded for example by spring 18 which pulls the pulleys 5 and 6 away from the pulley 2 to tighten the belt.

The pulleys 5 and 6 are spaced apart a distance such that the distance between the closest adjacent faces 9 and 10 of the pulleys 5 and 6 is not substantially different from the diameter of the driving pulley 2. Thus the idler pulleys 5 and 6 are positioned so that substantially 180° of belt wrap around the drive pulley 2 is obtained.

The use of the invention is as follows:

In use the motor 3 is turned on which rotates the pulley 2 thus driving the belt 4 to rotate the drum 1 and also the direct driving air impeller. Belt tension is maintained by the tension spring 18, the arm 15 and thus the pulleys 5 and 6.

It can therefore be seen that at least in the preferred form of the invention a drive system is provided which has a number of advantages.

1. The pulleys can be positioned to maintain substantially 180° of belt wrap around the drive pulley. Although the pulleys are mounted on a lever which moves pivotally, the pulleys 5 and 6 move only over a relatively short distance and over this distance the movement is substantially linear with respect to the drive pulley 2. Thus over a limited range, movement of the pulleys 5 and 6 does not materially change the amount of belt wrap around the pulley 2. It is also apparent that each pulley could be mounted on an arm independent of the other but we prefer the use of the single arm 15.

2. The pulleys 5 and 6 can substantially precisely control the position of the belt axially along the drive pulley and permit the drive pulley to be a true cylinder which enables improved drive of a flat belt when compared to a crowned pulley drive which is normally necessary to control the position of the belt.

3. The system is not direction sensitive and reverse direction rotation of the drum is able to be achieved without modification to the drive system.

4. A clothes dryer drum normally rotates at about 50 rpm and the actual rate of rotation is fairly critical and is dependent upon the diameter of the drum.

Four pole motors usually run at about 1420 rpm (for a 50 Hz power supply) or about 1700 rpm (for 60 Hz power supply). This means that the driving pulley has to be in the region of 20 mm diameter or less and this puts demands on the drive belt.

The air impeller which moves air through the dryer is limited in speed to the speed of rotation of the motor where the fan is directly mounted, for example about 1420 rpm.

The present invention allows the use of a higher speed motor e.g. a two pole motor rather than a typical four pole motor so that rotation of, for example, 2800 rpm is possible. Use of such a motor has the advantage of providing higher air pressures or permits the use of smaller diameter fans or a combination of both.

When using a two pole motor, the diameter of the drive pulley must be reduced further, for example to about half the diameter of the pulley used with a four pole motor but the present invention allows difficulties created with conventional drive belt systems to be substantially overcome.

The invention is also applicable to a multi V belt in which case the crowning of the pulleys 5 and 6 would not be necessary.

What is claimed is:

1. In a drive system for driving and driven rotatable members having a high ratio of diameters so that one rotatable member is relatively small with respect to the other, a flexible endless drive belt operably engaging said rotatable members so that they rotate together, and idler pulleys engaging said belt to assist in maintaining engagement of said belt with said rotatable members, the improvement comprising an idler pulley support arm pivotally supported at one end on a support member fixed with respect to the smaller rotatable member, a pair of idler pulleys rotatably mounted in fixed spaced relationship on the other end of said support arm closely adjacent and in substantially symmetrical relationship with the smaller rotatable member with the belt passing between them in engagement with the adjacent portions of their peripheral surfaces so that the belt engaging peripheral faces of said pulleys are spaced a distance apart substantially the same as the diameter of the smaller rotatable member in engagement with said belt and a straight line passing through the centers of rotation of said pulleys is substantially normal to the portions of the belt between said pulleys and the smaller rotatable member, and a spring means resiliently urging said arm about its pivot axis towards the larger rotatable member to maintain tension on said belt and substantially prevent reversal of direction of said driving member from materially effecting power transmission between the rotatable members.

2. A drive system as claimed in claim 1 wherein said belt engaging peripheral faces of each of said idler pulleys is crowned and said drive belt is a flat belt.

3. A drive system as claimed in claim 2 wherein the smaller rotatable member is the driving member and said pulleys are spaced substantially equi-distant therefrom.

4. A clothes dryer having a housing, a drum rotatably mounted in said housing, an electric motor mounted in said housing having an output shaft, and a drive system in accordance with claim 3 wherein said driven rotatable member comprises the rotatable drum, said driving rotatable member comprises a drive pulley on said motor shaft, a motor support bracket is provided rigidly attached to said housing, said motor being mounted on said bracket, said idler pulley support arm is pivotally supported on said bracket, and said spring means comprises a coil spring connected at one end to said support arm and at the other end to said bracket.

* * * * *